United States Patent
Lim et al.

(10) Patent No.: US 7,403,458 B2
(45) Date of Patent: Jul. 22, 2008

(54) COMPATIBLE OPTICAL PICKUP AND LIGHT OUTPUT AMOUNT DETECTING METHOD PERFORMED IN THE COMPATIBLE OPTICAL PICKUP

(75) Inventors: Ji-hwan Lim, Suwon-si (KR); Ju-hyung Lee, Suwon-si (KR); Pyong-yong Seong, Seoul (KR); Eun-goo Kim, Suwon-si (KR); Chun-gi Kim, Suwon-si (KR); Kyoung-hwan Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 723 days.

(21) Appl. No.: 10/766,328

(22) Filed: Jan. 29, 2004

(65) Prior Publication Data

US 2004/0257925 A1 Dec. 23, 2004

(30) Foreign Application Priority Data

Jan. 29, 2003 (KR) .................... 10-2003-0005925

(51) Int. Cl.
*G11B 7/00* (2006.01)
(52) U.S. Cl. ................. 369/53.26; 369/112.1
(58) Field of Classification Search ... 369/53.26–53.27, 369/44.23, 44.37, 94, 103
See application file for complete search history.

(56) References Cited

U.S. PATENT DOCUMENTS

| | | | |
|---|---|---|---|
| 5,247,167 A * | 9/1993 | Bargerhuff et al. | ....... 250/208.1 |
| 5,703,856 A | 12/1997 | Hayashi et al. | |
| 6,198,714 B1 | 3/2001 | Yoo et al. | |
| 6,304,540 B1 | 10/2001 | Yoo et al. | |
| 6,452,880 B1 * | 9/2002 | Kawamura et al. | ....... 369/44.37 |
| 6,781,947 B2 * | 8/2004 | Motegi et al. | .......... 369/112.28 |
| 7,035,191 B2 * | 4/2006 | Yoo et al. | ............. 369/112.01 |
| 2005/0036431 A1 * | 2/2005 | Ohuchida | ............. 369/112.05 |

FOREIGN PATENT DOCUMENTS

| | | |
|---|---|---|
| EP | 1 160 778 | 12/2001 |
| EP | 1 174 865 | 1/2002 |

OTHER PUBLICATIONS

European Search Report dated Mar. 29, 2007.

\* cited by examiner

*Primary Examiner*—Wayne Young
*Assistant Examiner*—LaTanya Bibbins
(74) *Attorney, Agent, or Firm*—Staas & Halsey LLP

(57) ABSTRACT

A compatible optical pickup, including first and second light sources for emitting lights with different wavelengths and first and second photodetectors for detecting an information signal and/or an error signal, and a method of detecting the amount of output light using the compatible optical pickup. The first and second photodetectors monitor the amount of light output from the second and first light sources respectively such that no extra front photodetectors are required. Thus, the number of optical component parts included in the optical pickup can be reduced, thereby lowering the manufacturing costs for the optical pickup. Also, there is no need to secure a space in a base where a front photodetector is to be installed, so the base is simplified. Thus, inferior moldings are reduced, and the durability of a mold can be prolonged.

43 Claims, 4 Drawing Sheets

COMPATIBLE OPTICAL PICKUP AND LIGHT OUTPUT AMOUNT DETECTING METHOD PERFORMED IN THE COMPATIBLE OPTICAL PICKUP

CROSS-REFERENCE TO RELATED APPLICATIONS

This application claims the benefit of Korean Patent Application No. 2003-5925, filed on Jan. 29, 2003, in the Korean Intellectual Property Office, the disclosure of which is incorporated herein in its entirety by reference.

BACKGROUND OF THE INVENTION

1. Field of the Invention

The present invention relates to a compatible optical pickup and a method of detecting the amount of light output by the compatible optical pickup.

2. Description of the Related Art

Recently, optical pickups have become more complicated, thereby requiring a large number of component parts to meet demands, such as, compatible adoption of various types of optical disks, an increase in multiple speeds, and the like.

However, recent optical pickups must also be compact and slim in consideration of a space limit partially due to the proliferation of portable terminals (e.g., notebook computers and the like). In order to meet the size constraints, recent optical pickups must reduce the number of component parts.

The minimization of the number and size of component parts included in an optical pickup is important for minimizing the manufacturing costs of the optical pickup, as well as simplifying the design of a base.

A typical optical pickup includes a separate front photodetector to monitor the amount of light output from a light source. Generally, the front photodetector is installed behind a cubic or plate-type beam splitter that the optical pickup uses as a light path converting device.

Typical optical pickups with separate front photodetectors have the following problems. First, since typical optical pickups include a large number of component parts, the manufacturing costs of the optical pickups are high. Second, since a base must have a space in which the front photodetectors are installed, the structure of the base is complex, causing a poor flow of liquid material for the base occuring during injection molding of the base. Hence, inferior molding frequently occurs, and the durability of the mold used in injection molding of the base decreases.

SUMMARY OF THE INVENTION

The present invention provides a compatible optical pickup, designed without extra front photodetectors, to monitor the amount of light output from a light source, and a method of detecting the amount of light being output using the compatible optical pickup.

According to an aspect of the present invention, there is an optical pickup compatible with first and second recording media using different formats, the optical pickup comprising first and second light sources and first and second photodetectors. The first light source emits a first light beam with a wavelength suitable for the first recording medium. The first photodetector detects an information signal and/or an error signal associated with the first recording medium. The second light source emits a second light beam with a wavelength suitable for the second recording medium. The second photodetector detects an information signal and/or an error signal associated with the second recording medium. The first photodetector monitors the amount of light output from the second light source by detecting a part of a second light beam that is emitted from the second light source and is incident on the first photodetector through a reflection process, and/or the second photodetector monitors the amount of light output from the first light source by detecting a part of a first light beam that is emitted from the first light source and is incident upon the second photodetector through a reflection process.

According to one aspect of the present invention, there is also a compatible optical pickup comprising first and second hologram optical modules. The first hologram optical module comprises: a first light source which emits a first light beam with a wavelength suitable for a first recording medium; a first hologram for changing the path of the first light beam; and a first photodetector which receives light reflected by a recording medium. The second hologram optical module comprises: a second light source which emits a second light beam with a wavelength suitable for a second recording medium with a format different from the format of the first recording medium; a second hologram for changing the path of the second light beam; and a second photodetector which receives light reflected by a recording medium. The first photodetector monitors the amount of light output from the second light source by detecting a part of a second light beam that is emitted from the second light source and incident on the first hologram optical module through a reflection process, and/or the second photodetector monitors the amount of light output from the first light source by detecting a part of a first light beam that is emitted from the first light source and incident upon the second hologram optical module through a reflection process.

According to an aspect of the present invention, the compatible optical pickup further comprises: a first detection circuit which is coupled to the first photodetector and produces a monitoring signal in proportion to the amount of light output from the second light source; and/or a second detection circuit which is coupled to the second photodetector and produces a monitoring signal in proportion to the amount of light output from the first light source.

According to another aspect of the present invention, the first photodetector monitors the amount of light output from the second light source by detecting a second light beam that is emitted from the second light source, reflected by a recording medium, and then incident upon the first photodetector, and/or the second photodetector monitors the amount of light output from the first light source by detecting a first light beam that is emitted from the first light source, reflected by the recording medium, and then incident upon the second photodetector.

In this case, the compatible optical pickup further comprises a plate-type beam splitter transmitting and reflecting each of the first and second light beams at a predetermined ratio.

According to an aspect of the present invention, a reflection element for reflecting a part of each of the first and/or second light beams is installed on a path common to the first and second light beams emitted from the first and second light sources, and the first photodetector monitors the amount of light output from the second light source by detecting a second light beam that is emitted from the second light source and is reflected by the reflection element to be incident on the first photodetector, and/or the second photodetector monitors the amount of light output from the first light source by detecting a first light beam that is emitted from the first light source and reflected by the reflection element to be incident upon the second photodetector.

According to an aspect of the present invention, the compatible optical pickup further comprises a cubic beam splitter which transmits and reflects each of the first and second light beams at a predetermined ratio. The reflection element is installed on a surface of the cubic beam splitter.

According to an aspect of the present invention, one of the first and second light sources emits a light beam with a wavelength suitable for recording and/or reproducing a CD-family recording medium, and the other emits a light beam with a wavelength suitable for recording and/or reproducing a DVD-family recording medium.

According to an aspect of the present invention, there is provided a method of detecting the amount of light output from a first and/or a second light source using an optical pickup which is compatible with first and second recording media with different formats by comprising first and second light sources and first and second photodetectors. The first light source emits a first light beam with a wavelength suitable for the first recording medium. The first photodetector detects an information signal and/or an error signal associated with the first recording medium. The second light source emits a second light beam with a wavelength suitable for the second recording medium. The second photodetector detects an information signal and/or an error signal associated with the second recording medium.

According to an aspect of the present invention, a part of a second light beam that is emitted from the second light source and incident on the first photodetector through a reflection process is detected using the first photodetector, and/or a part of a first light beam that is emitted from the first light source and incident upon the second photodetector through a reflection process is detected using the second photodetector. Thereafter, a monitoring signal which monitors the amount of light output from the second light source is produced using a signal corresponding to the second light beam detected by the first photodetector, and/or a monitoring signal for monitoring the amount of light output from the first light source is produced using a signal corresponding to the first light beam detected by the second photodetector.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
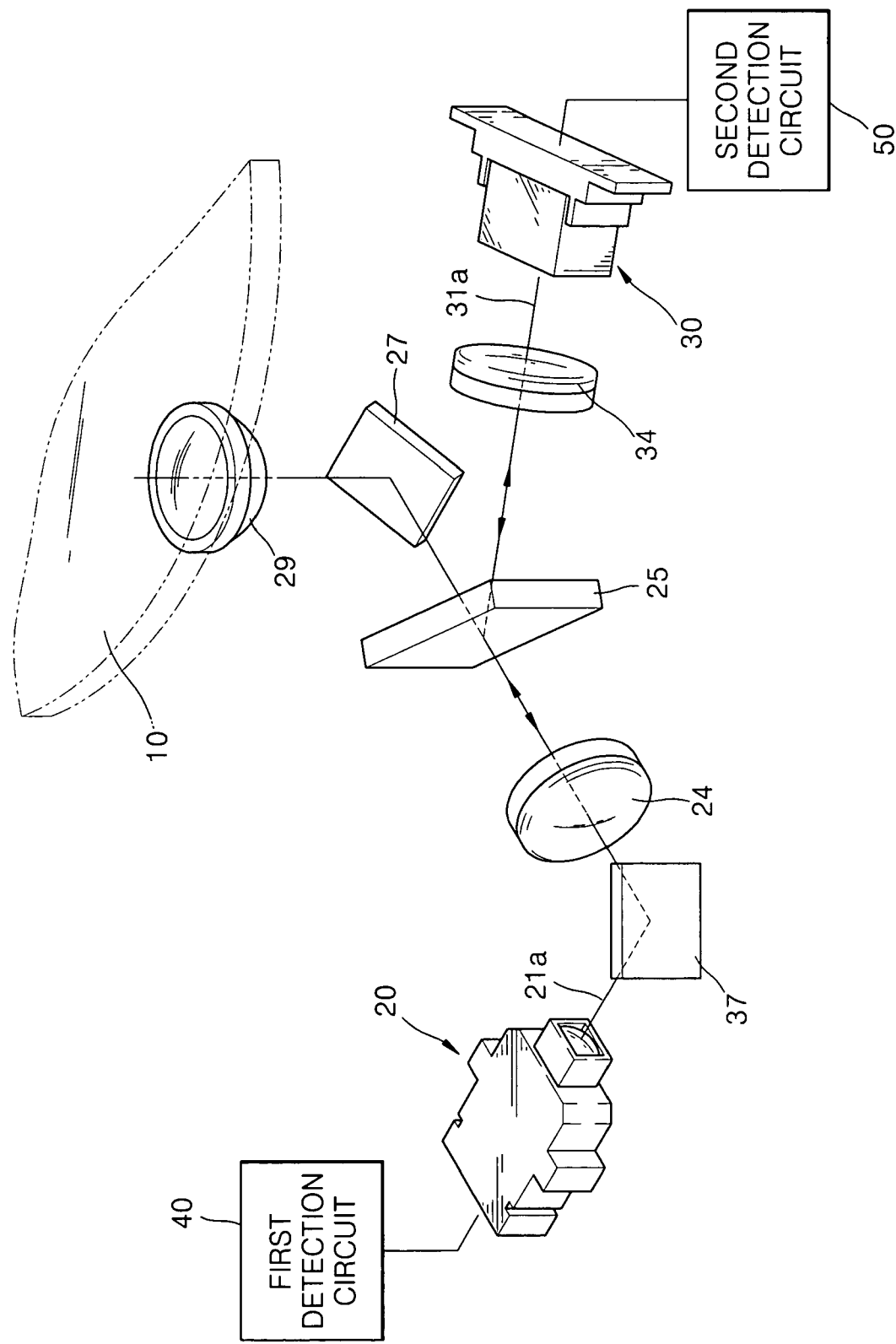
FIG. 1 is a perspective view for schematically showing a compatible optical pickup according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A compatible optical pickup according to the present invention includes first and second light sources for emitting light with different wavelengths and first and second photodetectors for detecting an information signal and/or an error signal. The second photodetector is used to monitor the amount of light emitted from the first source, and the first photodetector is used to monitor the amount of light emitted from the second source.

FIG. 1 is a perspective view for schematically showing a compatible optical pickup according to a first embodiment of the present invention. Referring to FIG. 1, the compatible optical pickup according to the first embodiment of the present invention can compatibly adopt two or more types of recording media with different formats, such as a high-density recording medium and a low-density recording medium. The optical pickup of FIG. 1 comprises: first and second hologram optical modules 20 and 30, an objective lens 29, a plate-type beam splitter 25, and first and second collimating lenses 24 and 34, arranged in an optical configuration. The objective lens 29 focuses incident light so as to form a light spot that lands on a recording surface of a recording medium 10. The plate-type beam splitter 25 transmits and reflects incident light at a predetermined ratio. The first collimating lense 24 is installed between the first hologram optical module and the plate-type beam splitter 25, and the second collimating lens 34 is installed between the second hologram optical module and the plate-type beam splitter 25.

Reference numerals 27 and 37 denote reflective mirrors. The optical configuration of the compatible optical pickup of FIG. 1 is suitable for a structure which reduces the thickness of an optical pickup to about a half of the thickness of an optical pickup with no reflective mirrors, otherwise known as a slim type optical pickup. An optical pickup according to the present invention may or may not have the reflective mirrors 27 and 37.

Figure 2:
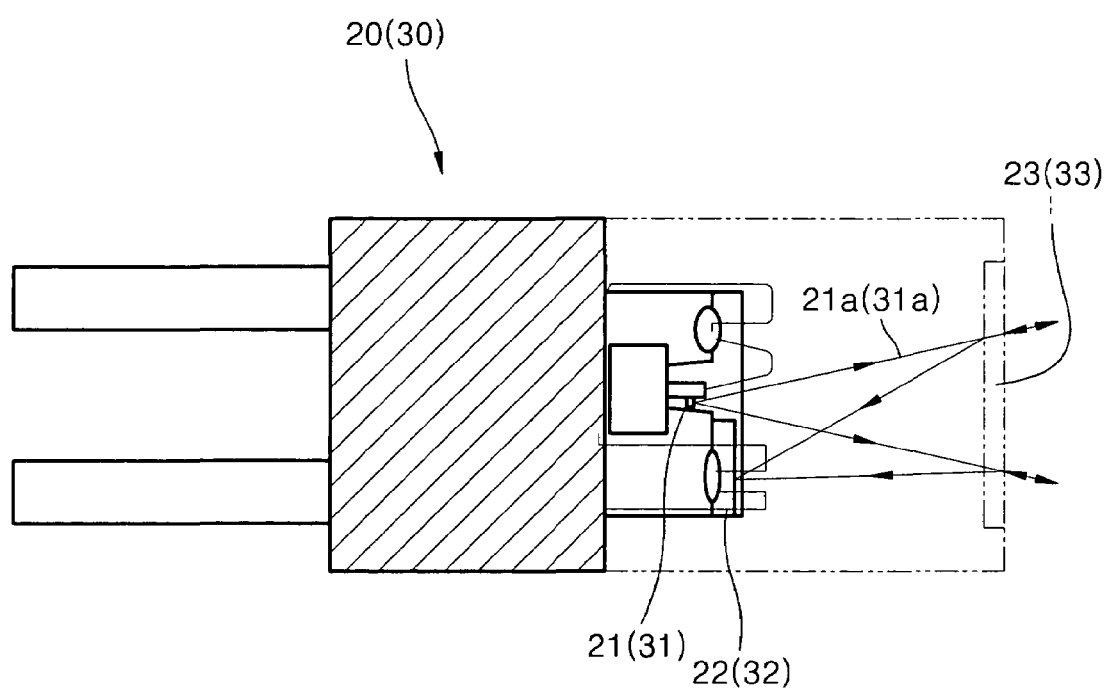
FIG. 2 is a schematic view of the hologram optical module of FIG. 1.

Each of the first and second hologram optical modules 20 and 30 can have a structure as shown in FIG. 2.

Referring to FIG. 2, the first hologram optical module 20 comprises: a first light source 21; a first hologram 23; and a first photodetector 22. The first light source 21 emits light with a predetermined wavelength that is suitable for recording on and/or reproducing from a high-density recording medium.

The second hologram optical module 30 comprises: a second light source 31, a second hologram 33, and a second photodetector 32. The second light source 31 emits light with a predetermined wavelength that is suitable for recording on and/or reproducing from a low-density recording medium. The second light source 31 emits light with a wavelength different from the light emitted from the first light source 21.

According to an aspect of the embodiment of the present invention as shown in FIG. 1, when the optical pickup compatibly adopts CDs and DVDs, the first light source 21 emits a first light beam 21a in a red wavelength range (e.g., a wavelength range of about 645 nm to 685 nm, preferably 650 nm), and the second light source 31 preferably emits a second light beam 31a in an infrared wavelength range (e.g., a wavelength range of about 770 nm to 810 nm, preferably 780 nm). Semiconductor lasers can be used as the first and second light sources 21 and 31.

According to an aspect of the present invention, when the optical pickup as shown in FIG. 1 compatibly adopts DVDs and next-generation DVDs, the first light source 21 preferably emits the first light beam 21a in a blue wavelength range (e.g., a wavelength range of about 400 nm to 420 nm), and the second light source 31 preferably emits the second light beam 31a in a red wavelength range (e.g., a wavelength range of about 645 nm to 685 nm).

Each of the first and second holograms 23 and 33 serves as a light path conversion device. The first hologram 23 transmits the first light beam 21a emitted from the first light source 21 without changing its path and diffracts incident first and second light beams 21a and 31a in ± first order and transmits the ± first order diffracted light to the first photodetector 22.

Similarly, the second hologram 33 transmits the second light beam 31a emitted from the second light source 31 without changing its path and diffracts incident first and second light beams 21a and 31a in ± first order and transmits the ± first order diffracted light to the second photodetector 32.

As described above, the first photodetector 22 receives the first and second light beams 21a and 31a incident on the first hologram optical module 20. More specifically, the first photodetector 22 receives a first light beam 21a that is reflected by the recording medium 10 and mostly transmitted by the plate-type beam splitter 25, and detects an information signal and/or an error signal associated with a high-density optical disk from the received first light beam 21a. The first photodetector 22 also receives a second light beam 31a that is reflected by the recording medium 10 and partially transmitted by the plate-type beam splitter 25, and detects a first monitoring signal from the received second light beam 31a for monitoring the amount of light emitted from the second light source 31.

According to another aspect of the present invention to be descried later, the second light beam 31a that is received by the first photodetector 22 and used to monitor the amount of light emitted from the second light source 31 is reflected by a reflective element 85 of FIG. 3 instead of the plate-type beam splitter 25.

As described above, the second photodetector 32 receives the first and second light beams 21a and 31a incident upon the second hologram optical module 30. More specifically, the second photodetector 32 receives a second light beam 31 a that is reflected by the recording medium 10 and mostly reflected by the plate-type beam splitter 25, and detects an information signal and/or an error signal associated with a low-density optical disk from the received second light beam 31a. The second photodetector 32 also receives a first light beam 21a that is reflected by the recording medium 10 and partially reflected by the plate-type beam splitter 25, and detects a second monitoring signal from the received first light beam 21a for monitoring the amount of light emitted from the first light source 21.

Figure 3:
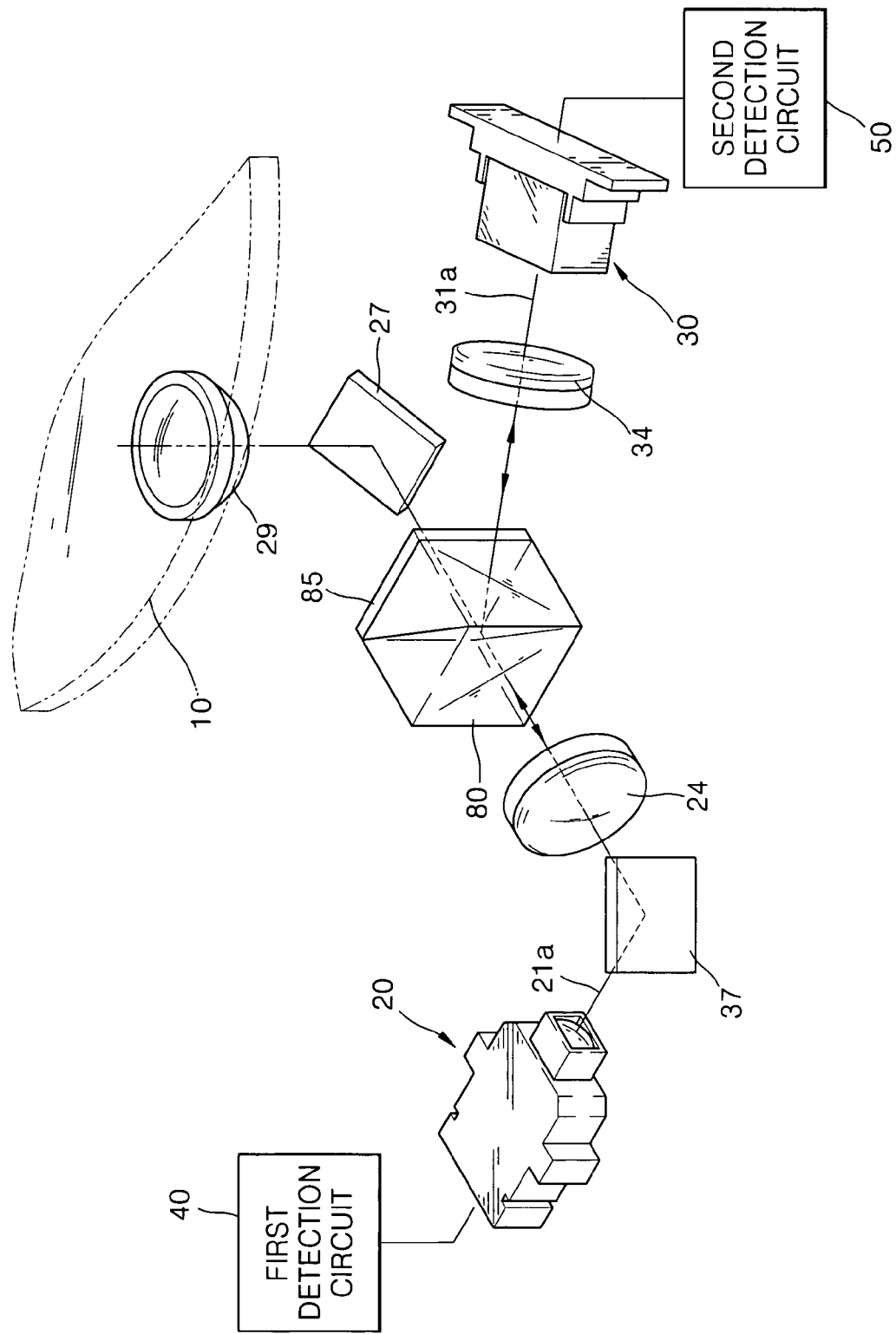
FIG. 3 is a perspective view for schematically showing a compatible optical pickup according to another aspect of the present invention.

According to the present invention as shown in FIG. 3 and to be descried later, the first light beam 21 a that is received by the second photodetector 32 and used to monitor the amount of light emitted from the first light source 31 has been reflected by the reflective element 85 of FIG. 3 instead of the plate-type beam splitter 25.

The compatible optical pickup according to the embodiment of the present invention as shown in FIG. 1 may include cubic beam splitters and/or plate-type beam splitters instead of the first and second holograms 23 and 33. Hence, the first light source 21 and the first photodetector 22 may be separately installed, and likewise for the second light source 31 and the second photodetector 32.

According to an aspect of the present invention, the plate-type beam splitter 25 transmits and reflects each of the first and second light beams 21a and 31a at a predetermined ratio.

For example, the plate-type beam splitter 25 transmits most of the first light beam 21a and reflects the rest of it. In this case, the majority of the first light beam 21a emitted from the first light source 21 passes through the plate-type beam splitter 25 and travels toward the recording medium 10. Most of the first light beam 21a reflected by the recording medium 10 is transmitted by the plate-type beam splitter 25 toward the first hologram optical module 20, and the rest is reflected by the plate-type beam splitter 25 toward the second hologram optical module 30.

Hence, the second photodetector 32 of the second hologram optical module 30 can receive a part of the first light beam 21a emitted from the first light source 21 and accordingly monitor the amount of light output from the first light source 21.

Also, the plate-type beam splitter 25 reflects most of the second light beam 31a and transmits the rest of it. In this case, the majority of the second light beam 31a emitted from the second light source 31 is reflected by the plate-type beam splitter 25 toward the recording medium 10. Most of the second light beam 31a reflected by the recording medium 10 is re-reflected by the plate-type beam splitter 25 toward the second hologram optical module 30, and the rest is transmitted by the plate-type beam splitter 25 toward the first hologram optical module 20. Hence, the first photodetector 22 of the first hologram optical module 20 can receive a part of the second light beam 31a emitted from the second light source 31 and accordingly monitor the amount of light output from the second light source 31.

The compatible optical pickup, according to the embodiment of the present invention as shown in FIG. 1, utilizes a plate-type beam splitter 25 and monitors the amount of light emitted from the first light source 21 and/or the second light source 31 by using a signal corresponding to the first light beam 21a reflected by the recording medium 10 that the second photodetector 32 of the second hologram optical module 30 detects and by using a signal corresponding to the second light beam 31a reflected by the recording medium 10 that the first photodetector 22 of the first hologram optical module 20 detects.

Referring to FIGS. 2 and 3, to monitor the amount of light emitted from the first light source 21 and/or the second light source 31, a compatible optical pickup according to an aspect of the present invention includes the reflection element 85 on the common path of the first and second light beams 21a and 31a for reflecting a part of the first light beam 21a and/or the second light beam 31a, instead of using the first light beam 21a and/or the second light beam 31a reflected by the recording medium 10.

Also, as shown in FIG. 3, the compatible optical pickup according to an aspect of the present invention includes a cubic beam splitter 80 for transmitting and reflecting each of the first and second light beams 21a and 31a at a predetermined ratio, instead of the plate-type beam splitter 25 of FIG. 1. The reflection element 85 can be installed on a light emission surface of the cubic beam splitter 80. The reflection element 85 may be a coating on the light emission surface of the cubic beam splitter 80 or a separate element attached to the light emission surface thereof.

In the compatible optical pickup according to an aspect of the present invention, the plate-type beam splitter 25 may be used instead of the cubic beam splitter 80 as shown in FIG. 3. Also, in the compatible optical pickup according to the present invention as shown in FIG. 1, the cubic beam splitter 80 may be used instead of the plate-type beam splitter 25.

The reference numerals of FIG. 3 that coincide with those of FIG. 1 denote like optical elements, thus, they will not be described here.

As shown in FIG. 3, when the reflection element 85 is installed on the common path of the first and second light beams 21a and 31a, a part of the first light beam 21a, which is emitted from the first light source 21 and transmitted by the cubic (plate-type) beam splitter 80 (25), is reflected by the reflection element 85 toward the second hologram optical module 30 and then incident upon the second photodetector 32. Also, a part of the second light beam 31a, which is emitted from the second light source 31 and reflected by the cubic (plate-type) beam splitter 80 (25), is reflected by the reflection element 85 toward the first hologram optical module 20 and then incident upon the first photodetector 22. Hence, the first photodetector 22 can monitor the amount of light emitted from the second light source 31, and/or the second photodetector 32 can monitor the amount of light emitted from the first light source 21.

As shown in FIGS. 1, 2, and 3, the compatible optical pickups may include a first detection circuit 40 and/or a second detection circuit 50. The first detection circuit 40 is connected to the first photodetector 22 and can produce the first monitoring signal for monitoring the amount of light emitted from the second light source 31. The second detection circuit 50 is connected to the second photodetector 32 and can produce the second monitoring signal for monitoring the amount of light emitted from the first light source 21. Here, FIGS. 1 and 3 show examples in which the first and second detection circuits 40 and 50 are included. The first and second detection circuits 40 and 50 are photo detector integrated circuits (PDICs) connected to the first and second photodetectors 22 and 32, respectively.

According to an aspect of the present invention, the first detection circuit 40 also detects an information signal and/or an error signal associated with a high-density optical disk from a signal corresponding to the first light beam 21a detected by the first photodetector 22.

According to an aspect of the present invention, the second detection circuit 50 detects an information signal and/or an error signal associated with a low-density optical disk from a signal corresponding to the second light beam 31a detected by the second photodetector 32.

Figure 4:
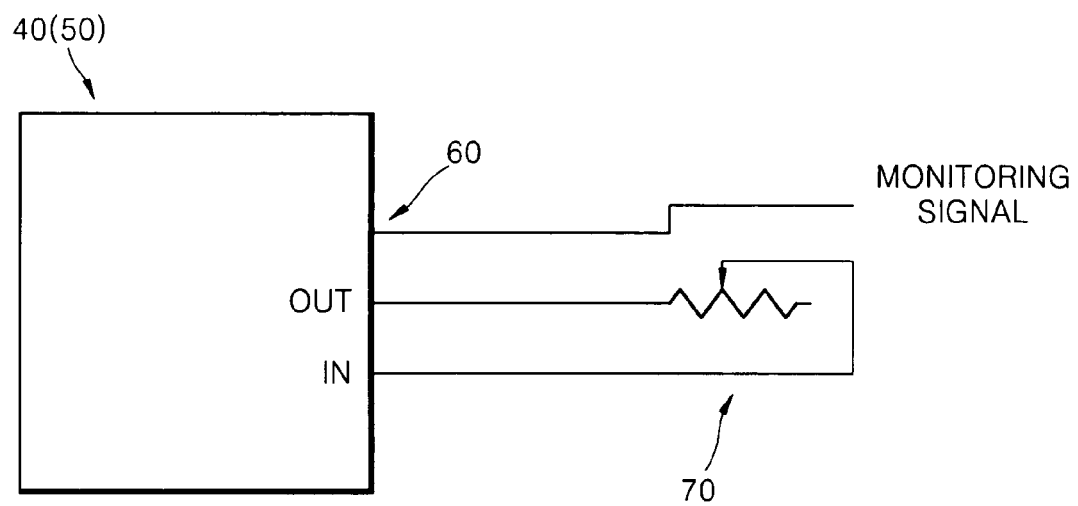
FIG. 4 shows the main output terminals of the detection circuit of FIGS. 1 and 3.

As shown in FIG. 4, each of the first and second detection circuits 40 and 50 comprises an output terminal 60 for outputting the first and second monitoring signals. The output terminal 60 may serve as an output terminal for outputting an information reproduction signal, that is, a radio frequency (RF) signal. Alternatively, the output terminal 60 may be a separately added terminal which outputs a monitoring signal with respect to a typical PDIC.

The reason why a monitoring signal and an information reproduction signal are output via an identical output terminal will now be described. According to an aspect of the present invention, during recording and/or reproduction of a high-density optical disk, the first light source 21 of the first hologram optical module 20 emits the first light beam 21a, and the first photodetector 22 of the first hologram optical module 20 detects an information signal and/or an error signal associated with the high-density optical disk. The second light source 31 and the second photodetector 32 of the second hologram optical module 30 are not used for recording and/or reproduction of a high-density optical disk. At this time, a part of the first light beam 21a reflected by the high-density optical disk can be detected by the second photodetector 32, and the second monitoring signal produced from the signal corresponding to the detected first light beam 21a can be output via an output terminal of the second detection circuit 50 that is common to a monitoring signal and an information reproduction signal. Likewise, during recording and/or reproduction of a low-density optical disk, the first monitoring signal for monitoring the amount of light emitted from the second light source 31 can be output via an output terminal of the first detection circuit 40 that is common to a monitoring signal and an information reproduction signal.

FIG. 4 shows an example in which each of the first and second detection circuits 40 and 50 includes a controller 70, for example, a variable resistor, for controlling the amplification rate of a monitoring signal. In other words, when the controller 70 is included, there is an advantage in that the amplification rate of the first or second monitoring signal can be controlled.

Since the first and second detection circuits 40 and 50 can be designed to have various structures by those skilled in the art with reference to the above description of the invention, the design of the first and second detection circuits 40 and 50 will not be described and/or shown in greater detail.

In the above-described compatible optical pickups according to the present invention, during recording and/or reproduction of a high-density optical disk, the amount of light emitted from the first light source 21 is monitored by the second photodetector 32 for use in detecting an information signal and/or an error signal associated with a low-density optical disk. During recording and/or reproduction of a low-density optical disk, the amount of light emitted from the second light source 31 is monitored by the first photodetector 22 for use in detecting an information signal and/or an error signal associated with a high-density optical disk. Accordingly, the compatible optical pickups according to the present invention require no extra monitoring photodetectors, can reduce the number of component parts compared with a conventional front photodetector, and do not need to have a space for the conventional front photodetector to be installed.

An example of the paths of the first and second light beams 21a and 31a emitted from the first and second hologram optical modules 20 and 30 will now be described using FIGS. 1 and 2. For the purpose of the example, it will be assumed that the first hologram optical module 20 is suitable for recording and/or reproducing high-density optical disks, for example, DVDs, and the second hologram optical module 30 is suitable for recording and/or reproducing low-density optical disks, for example, CDs. The reflective mirrors 27 and 37 are assumed to fully reflect any light incident upon them, and thus shall be ignored for the purposes of the example. In alternate aspects of the present invention, various arrangements of multiple or singular mirrors can be utilized without changing the operation of the optical pickups.

When a DVD is used as the recording medium 10, the first optical source 21 operates to emit the first light beam 21a, which is a divergent light beam. The first light beam 21a is transmitted by the first hologram 23 and collimated by the first collimating lens 24 so as to be a parallel beam. Then, the first light beam 21a is incident upon the plate-type beam splitter 25, the first light beam 21a is then transmitted thereby toward the objective lens 29. The first light beam 21a is incident upon the objective lens 29 and condensed thereby so that a light spot lands on a recording surface of the recording medium 10.

The first light beam 21a is reflected by the recording surface of the recording medium 10 and is then incident upon the plate-type beam splitter 25 via the objective lens 29. Most of the incident first light beam 21a is transmitted by the plate-type beam splitter 25 toward the first hologram optical module 20, and the rest is reflected by the plate-type beam splitter 25 toward the second hologram optical module 30. The majority and minority of the first light beam 21a are incident upon the first and second hologram optical modules 20 and 30, respectively, diffracted and transmitted by the first and second holograms 23 and 33, respectively, and then incident upon the first and second photodetectors 22 and 32, respectively. The first detection circuit 40 produces an information signal and/or an error signal from a signal corresponding to the majority of the first light beam 21a detected by the first photodetector 22. The second detection circuit 50 produces the second monitoring signal for monitoring the amount of light emitted from the first light source 21, from a signal corresponding to the minority of the first light beam 21a detected by the second photodetector 32. Hence, when the amount of light emitted from the first light source 21 is controlled using a signal corresponding to light detected by the second photodetector 32, it can be controlled so that light emitted from the first light source 21 has an appropriate recording power for a DVD.

When a CD is adopted as the recording medium 10, the second optical source 31 operates to emit the second light beam 31a, which is a divergent light beam. The second light beam 31a is straightly transmitted by the second hologram 33 and collimated by the second collimating lens 34 so as to be a parallel beam. Then, the second light beam 31a is incident upon the plate-type beam splitter 25 and mostly reflected thereby toward the objective lens 29. The second light beam 31a is incident upon the objective lens 29 and condensed thereby so that a light spot lands on the recording surface of the recording medium 10. The second light beam 31a is reflected by the recording surface of the recording medium 10 and is then incident upon the plate-type beam splitter 25 via the objective lens 29. Most of the incident second light beam 31a is reflected by the plate-type beam splitter 25 toward the second hologram optical module 30, and the rest is transmitted by the plate-type beam splitter 25 toward the first hologram optical module 20. The majority and minority of the second light beam 31a are incident upon the second and first hologram optical modules 30 and 20, respectively, diffracted and transmitted by the second and first holograms 33 and 23, respectively, and then made incident upon the second and first photodetectors 32 and 22, respectively. The second detection circuit 50 produces an information signal and/or an error signal from a signal corresponding to the majority of the second light beam 31a detected by the second photodetector 32. The first detection circuit 40 produces the first monitoring signal for monitoring the amount of light emitted from the second light source 31, from a signal corresponding to the minority of the second light beam 31a detected by the first photodetector 22. Hence, when the amount of light emitted from the second light source 31 is controlled using a signal corresponding to light detected by the first photodetector 22, it can be controlled so that light emitted from the second light source 31 has an appropriate recording power for a CD.

Since the paths of the light in the compatible optical pickup according to an aspect of the present invention of FIG. 3 can be sufficiently construed from the description above, it will not be described here.

Each of the compatible optical pickups according to the present invention may have an optical system in which the first light beam 21a emitted from the first light source 21 is reflected by the plate-type or cubic beam splitter 25 or 80 toward the objective lens 29 and in which the second light beam 31a emitted from the second light source 31 is transmitted by the plate-type or cubic beam splitter 25 or 80 toward the objective lens 29.

The above-described compatible optical pickups according to the present invention and the above-described light output amount detecting methods performed therein are only examples, and are not intended to limit the present invention. Various changes in form and details can be made in the present invention.

For example, a compatible optical pickup according to the present invention may be designed so as to monitor the amount of light output from a light source so that the output light is suitable for only a high-density optical disk or a low-density optical disk. Of course, this optical pickup structure can be sufficiently construed from the embodiments of the present invention, thus, it will not be described in greater detail.

Such compatible optical pickups according to the present invention as described above can be used to record an information signal to at least a part of a CD-series recording medium and/or to at least a part of a DVD-series recording medium.

Figure 5:
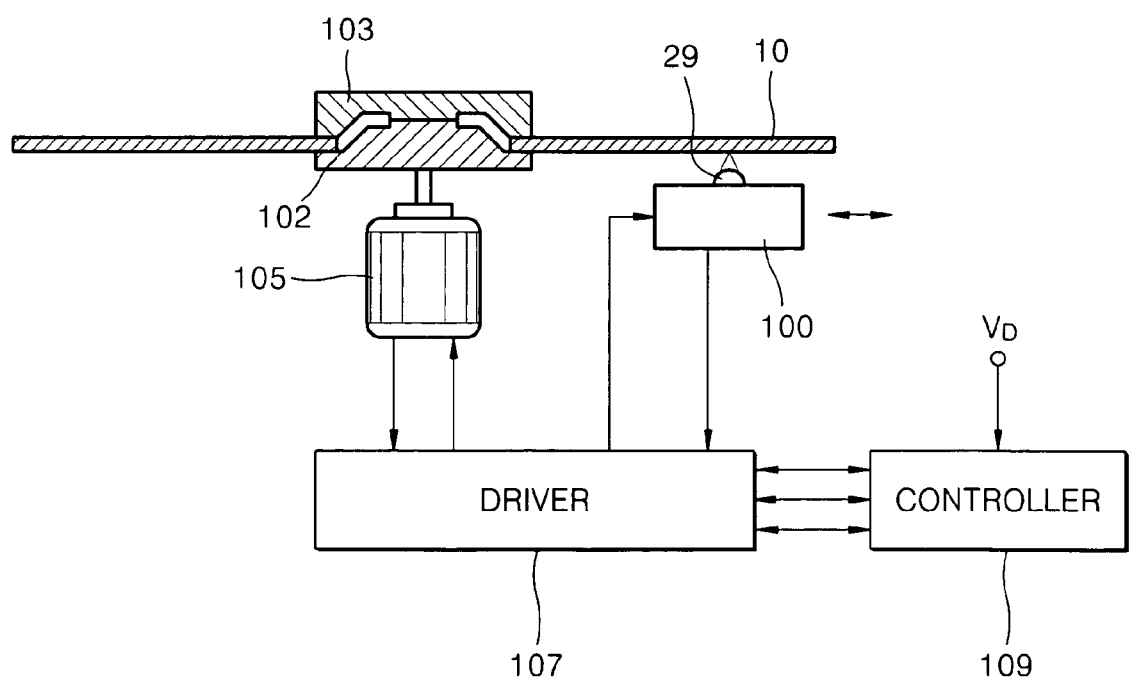
FIG. 5 schematically shows the configuration of a compatible optical recording and/or reproducing apparatus comprising a compatible optical pickup according to the present invention.

FIG. 5 schematically shows a configuration of a compatible optical recording and/or reproducing apparatus comprising a compatible optical pickup 100 according to the present invention. Referring to FIG. 5, the compatible optical recording and/or reproducing apparatus comprises: a spindle motor 105, the compatible optical pickup 100, a driver 107, and a controller 109. The spindle motor 105 rotates a recording medium 10, which is an optical information storage medium. The compatible optical pickup 100 is installed so as to move over the recording medium 10 in the radial direction of the recording medium 10 and reproduces data from and/or records data to the recording medium 10. The driver 107 drives the spindle motor 105 and the optical pickup 100. The controller 109 controls a focusing servo, a tracking servo, and/or a tilting servo of the compatible optical pickup 100. Reference numeral 102 denotes a turntable, and reference numeral 103 denotes a clamp for chucking the recording medium 10.

The compatible optical pickup 100 includes an optical system designed to compatibly deal with a plurality of types of recording media with different formats, for example, DVDs and CDs, and an actuator (not shown) for driving the objective lens 29. DVDs and CDs are mentioned only as examples, and are not intended to limit the scope of the invention. The invention is intended to be used with any form of optical media.

Light reflected by the recording medium 10 is detected by a photodetector included in the compatible optical pickup 100, for example, by the first or second photodetector 22 or 32 of the first or second hologram optical module 20 or 30 of the compatible optical pickup according to the present invention, in consideration of the type of an adopted recording medium. The detected light is converted into an electrical signal, and the electrical signal is applied to the controller 109 via the driver 107. The driver 107 controls the rotation speed of the spindle motor 105, amplifies the received electrical signal, and drives the compatible optical pickup 100. The controller 109 controls a focusing servo command, a tracking servo command, and/or a tilting servo command on the basis of the electrical signal received from the driver 107 and sends the controlled commands to the driver 107 so that the compatible optical pickup 100 can perform focusing, tracking, and/or tilting.

As described above, the compatible optical recording and/or reproducing apparatus adopting the compatible optical pickup 100 according to the present invention can compatibly deal with a plurality of types of recording media with different formats.

In a compatible optical pickup according to the present invention as described above, a photodetector for use in detecting an information signal and/or an error signal is used to detect a signal for use in monitoring the amount of light output from a light source, so that the amount of light output from the light source can be monitored without extra front photodetectors. Thus, the number of optical component parts that constitute an optical pickup can be reduced, thereby lowering the manufacturing costs for the optical pickup.

Also, there is no need to secure a space in a base where a front photodetector is to be installed, so the base is simplified. Thus, inferior moldings are reduced, and the durability of a mold can be prolonged.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup, which is compatible with a first recording medium having a first format and a second recording medium having a second format different from the first format, the optical pickup comprising:
   a first light source which emits a first light beam, the first light beam having a wavelength suitable for the first recording medium;
   a first photodetector which detects an information signal associated with the first recording medium and based upon the first light beam;
   a second light source which emits a second light beam, the second light beam having a wavelength suitable for the second recording medium; and
   a second photodetector which detects an information signal associated with the second recording medium and based upon the second light beam,
   wherein the first photodetector monitors the amount of light emitted from the second light source by detecting a part of the second light beam that is emitted from the second light source and is incident on the first photodetector through a reflection process, and/or the second photodetector monitors the amount of light emitted from the first light source by detecting a part of a first light beam that is emitted from the first light source and is incident upon the second photodetector through a reflection process.

2. The optical pickup of claim 1, further comprising at least one of:
   a first detection circuit which is coupled to the first photodetector and produces a monitoring signal in proportion to the amount of light emitted from the second light source; and
   a second detection circuit which is coupled to the second photodetector and produces a monitoring signal in proportion to the amount of light output from the first light source.

3. The optical pickup of claim 1, wherein the first photodetector monitors the amount of light emitted from the second light source by detecting a second light beam that is emitted from the second light source, reflected by a recording medium, and then incident upon the first photodetector, and/or the second photodetector monitors the amount of light output from the first light source by detecting a first light beam that is emitted from the first light source, reflected by the recording medium, and then incident upon the second photodetector.

4. The optical pickup of claim 3, further comprising a plate-type beam splitter transmitting and reflecting each of the first and second light beams at a predetermined ratio.

5. The optical pickup of claim 1, further comprising a reflection element which reflects a portion of each of the first and/or second light beams and is installed on a path common to the first and second light beam emitted from the first and second light source, and the first photodetector monitors the amount of light emitted from the second light source by detecting a second light beam that is emitted from the second light source, reflected by the reflection element, and then incident on the first photodetector, and/or the second photodetector monitors the amount of light emitted from the first light source by detecting a first light beam that is emitted from the first light source, reflected by the reflection element, and incident upon the second photodetector.

6. The optical pickup of claim 5, further comprising a cubic beam splitter which transmits and reflects each of the first and second light beams at a predetermined ratio.

7. The optical pickup of claim 5, wherein the reflection element is formed on a surface of the cubic beam splitter.

8. The optical pickup of claim 1, wherein one of the first and second light sources emits a light beam with a wavelength suitable for recording to and/or reproducing from a CD-family recording medium, and the other one of the first and second light sources emits a light beam with a wavelength suitable for recording to and/or reproducing from a DVD-family recording medium.

9. The optical pickup of claim 8, wherein the compatible optical pickup records an information signal to at least a part of the CD-family recording medium.

10. The optical pickup of claim 8, wherein the compatible optical pickup records an information signal to at least a part of the DVD-family recording medium.

11. The optical pickup of claim 1, wherein the first photodetector detects an error signal associated with the first recording medium and based upon the first light beam, and the second photodetector detects an error signal associated with the second recording medium and based upon the second light beam.

12. The optical pickup of claim 1, wherein the first light source and the first photodetector are separately installed.

13. The optical pickup of claim 1, wherein the second light source and the second photodetector are separately installed.

14. The optical pickup of claim 1, further comprising a reflection element, wherein the reflection element which reflects a portion of each of the first and/or second light beam is installed on a path common to the first and second light beam emitted from the first and second light source, and the first photodetector monitors the amount of light emitted from the second light source by detecting a second light beam that is emitted from the second light source and is reflected by the reflection element to be incident on the first photodetector, and/or the second photodetector monitors the amount of light emitted from the first light source by detecting a first light beam that is emitted from the first light source and reflected by the reflection element to be incident upon the second photodetector.

15. The optical pickup of claim 14, further comprising a cubic beam splitter which transmits and reflects each of the first and second light beams at a predetermined ratio.

16. The optical pickup of claim 14, wherein the reflection element is installed on a surface of the cubic beam splitter.

17. The optical pickup of claim 14, wherein the reflection element is a coating on a light emission surface of the cubic beam splitter.

18. An optical pickup comprising:
a first hologram optical module comprising;
a first light source which emits a first light beam with a wavelength suitable for a first recording medium,
a first hologram which changes the path of the first light beam, and
a first photodetector which receives light reflected by a recording medium; and
a second hologram optical module comprising;
a second light source which emits a second light beam with a wavelength suitable for a second recording medium,
a second hologram which changes the path of the second light beam, and
a second photodetector, which receives light reflected by a recording medium;
wherein the first photodetector monitors the amount of light emitted from the second light source by detecting a portion of a second light beam that is emitted from the second light source and incident on the first hologram optical module through a reflection process, and/or the second photodetector monitors the amount of light emitted from the first light source by detecting a portion of a first light beam that is emitted from the first light source and incident upon the second hologram optical module through a reflection process.

19. The optical pickup of claim 18, wherein the wavelength of the first light beam is different than the wavelength of the second light beam.

20. The optical pickup of claim 18, wherein the first recording medium has a first format and the second recording medium has a second format different from the second format.

21. The optical pickup of claim 18, wherein the first light beam is in a red wavelength range.

22. The optical pickup of claim 18, wherein the wavelength of the first light beam is between 645 nm and 685 nm.

23. The optical pickup of claim 18, wherein the second light beam is in an infrared wavelength range.

24. The optical pickup of claim 18, wherein the wavelength of the second light beam is between 770 nm and 810 nm.

25. The optical pickup of claim 18, wherein the first and second light sources are semiconductor lasers.

26. The optical pickup of claim 18, wherein the optical pickup compatibly adopts DVDs and the first light beam is in a blue wavelength range and the second light beam is in a red wavelength range.

27. The optical pickup of claim 18, wherein each of the first and second holograms serves as a light path conversion device, and the first hologram transmits the first light beam emitted from the first light source without changing a path thereof and diffracts incident first and second light beams in ± first order and transmits the ± first order diffracted light of the first and second light beams to the first photodetector.

28. The optical pickup of claim 18, wherein the second hologram transmits the second light beam emitted from the second light source without changing a path thereof and diffracts incident first and second light beams in ± first order and transmits the ± first order diffracted light of the first and second light beams to the second photodetector.

29. The optical pickup of claim 18, further comprising at least one of:
a first detection circuit which is coupled to the first photodetector and produces a monitoring signal in proportion to the amount of light emitted from the second light source; and
a second detection circuit which is coupled to the second photodetector and produces a monitoring signal in proportion to the amount of light emitted from the first light source.

30. The optical pickup of claim 18, wherein at least one of the first detection circuit and second detection circuit comprises an output terminal which outputs monitoring signal.

31. The optical pickup of claim 30, wherein each of the at least one output terminals outputs an information reproduction signal, that is, a radio frequency (RF) signal.

32. The optical pickup of claim 30, wherein each of the first and second detection circuits further comprises a controller.

33. The optical pickup of claim 32, wherein each of the controllers is a variable resistor which controls the amplification rate of a monitoring signal.

34. The optical pickup of claim 18, wherein each of the at least one output terminals may be a separately added terminal which outputs a monitoring signal with respect to a typical PDIC.

35. The optical pickup of claim 18, wherein the first photodetector monitors the amount of light emitted from the second light source by detecting a second light beam that is emitted from the second light source, reflected by a recording medium, and then incident upon the first photodetector, and/or the second photodetector monitors the amount of light emitted from the first light source by detecting a first light beam that is emitted from the first light source, reflected by the recording medium, and then incident upon the second photodetector.

36. The optical pickup of claim 35, further comprising a plate-type beam splitter which transmits and reflects each of the first and second light beams at a predetermined ratio.

37. The optical pickup of claim 18, further comprising a reflection element, wherein the reflection element which reflects a portion of each of the first and/or second light beam is installed on a path common to the first and second light beam emitted from the first and second light source, and the first photodetector monitors the amount of light emitted from the second light source by detecting a second light beam that is emitted from the second light source and is reflected by the reflection element to be incident on the first photodetector, and/or the second photodetector monitors the amount of light emitted from the first light source by detecting a first light beam that is emitted from the first light source and reflected by the reflection element to be incident upon the second photodetector.

38. The optical pickup of claim 18, wherein one of the first and second light sources emits a light beam with a wavelength suitable for at least one of recording and reproducing a CD-family recording medium, and the other one of the first and second light sources emits a light beam with a wavelength suitable for at least one of recording and reproducing a DVD-family recording medium.

39. The optical pickup of claim 38, wherein the compatible optical pickup can record an information signal to at least a part of the CD-family recording medium.

40. The optical pickup of claim 38, wherein the compatible optical pickup can record an information signal to at least a part of the DVD-family recording medium.

41. A method of detecting the amount of light output from at least one of a first and a second light source using an optical pickup which is compatible with a first recording medium and a second recording medium, the first and second recording media having different formats, the optical pickup comprising: a first light source emitting a first light beam with a wavelength suitable for the first recording medium; a first photodetector which detects at least one of an information signal and an error signal associated with the first recording medium; a second light source emitting a second light beam with a wavelength suitable for the second recording medium; and a second photodetector detecting at least one of an information signal and an error signal associated with the second recording medium, the method comprising:

detecting at least one of a portion of a second light beam that is emitted from the second light source and incident on the first photodetector through a reflection process, using the first photodetector, and a part of a first light beam that is emitted from the first light source and incident upon the second photodetector through a reflection process, using the second photodetector; and producing at least one of a monitoring signal for monitoring the amount of light emitted from the second light source using a signal corresponding to the second light beam detected by the first photodetector, and a monitoring signal for monitoring the amount of light output from the first light source using a signal corresponding to the first light beam detected by the second photodetector.

42. The method of claim 41, wherein one of the first and second light sources emits a light beam with a wavelength suitable for recording and/or reproducing a CD-family recording medium, and the other one of the first and second light sources emits a light beam with a wavelength suitable for recording and/or reproducing a DVD-family recording medium.

43. The optical pickup of claim 41, wherein the first photodetector detects an error signal associated with the first recording medium, and the second photodetector detects an error signal associated with the second recording medium.

\* \* \* \* \*

UNITED STATES PATENT AND TRADEMARK OFFICE
CERTIFICATE OF CORRECTION

| | |
|---|---|
| PATENT NO. | : 7,403,458 B2 |
| APPLICATION NO. | : 10/766328 |
| DATED | : July 22, 2008 |
| INVENTOR(S) | : Ji-hwan Lim et al. |

It is certified that error appears in the above-identified patent and that said Letters Patent is hereby corrected as shown below:

Column 14, Line 64, change "media" to --medium--.

Signed and Sealed this

Eighteenth Day of November, 2008

JON W. DUDAS
*Director of the United States Patent and Trademark Office*